United States Patent
Harrison

(10) Patent No.: US 12,418,199 B2
(45) Date of Patent: Sep. 16, 2025

(54) INDUCTIVELY POWERED DEVICE DRIVER

(71) Applicant: Energy Research Lab Ltd, London (GB)

(72) Inventor: Lee Harrison, Wilstead (GB)

(73) Assignee: QBYSS Ltd, London (GB)

( * ) Notice: Subject to any disclaimer, the term of this patent is extended or adjusted under 35 U.S.C. 154(b) by 0 days.

(21) Appl. No.: 18/189,487

(22) Filed: Mar. 24, 2023

(65) Prior Publication Data
US 2023/0231418 A1    Jul. 20, 2023

Related U.S. Application Data

(63) Continuation of application No. PCT/GB2021/052501, filed on Sep. 24, 2021.

(51) Int. Cl.
H01F 7/02      (2006.01)
H01F 27/24     (2006.01)
H01F 27/28     (2006.01)
H02J 50/10     (2016.01)

(52) U.S. Cl.
CPC .............. H02J 50/10 (2016.02); H01F 7/02 (2013.01); H01F 27/24 (2013.01); H01F 27/28 (2013.01)

(58) Field of Classification Search
CPC .. H02J 50/10; H01F 7/02; H01F 27/24; H01F 27/28; H01F 27/306; H01F 7/0252; H01F 27/263; H01F 38/14
See application file for complete search history.

(56) References Cited

U.S. PATENT DOCUMENTS

2006/0229040 A1    10/2006    Hofer et al.

FOREIGN PATENT DOCUMENTS

| CN | 100417544 C | * | 9/2008 | ............... B60L 5/00 |
|---|---|---|---|---|
| EP | 3171377 | | 5/2017 | |
| GB | 2547452 | | 8/2017 | |
| JP | 2000-348956 | | 12/2000 | |
| JP | 2006-286668 | | 10/2006 | |
| JP | 2007-88011 | | 4/2007 | |

OTHER PUBLICATIONS

GB2015127 search and examination report dated Mar. 16, 2021.
GB2113684.1 search and exam report dated Mar. 22, 2022.
GB2113684.1 second exam report dated Jul. 20, 2022.
PCT/GB2021/052501 International Search Report and Written Opinion dated Feb. 3, 2022.

* cited by examiner

*Primary Examiner* — Daniel Cavallari
(74) *Attorney, Agent, or Firm* — Woodard Emhardt Henry Reeves & Wagner LLP

(57) ABSTRACT

An inductively powered device driver comprising a secondary winding to be coupled to a primary winding and a ferrite core formed of two separable parts, and further comprising a permanent magnet attached to each part of the ferrite core. The permanent magnet(s) are preferably separated from the ferrite core by an insulator. One part of the ferrite core preferably comprises a metal plate positioned between the two parts of the ferrite core.

23 Claims, 6 Drawing Sheets

INDUCTIVELY POWERED DEVICE DRIVER

CROSS-REFERENCE TO RELATED APPLICATIONS

This application is a continuation of PCT/GB2021/052501 filed Sep. 24, 2021, which claims the benefit of GB2015127.0 filed Sep. 24, 2020, which are hereby incorporated by reference.

BACKGROUND

This invention relates to inductively powered device drivers used on a high frequency alternating current (HFAC) system.

Inductively powered devices can be placed along a power bus and the alternating magnetic field induces a current in a secondary winding which then powers a device. In order to increase the magnetic flux between the primary winding (formed by the power bus) and the secondary winding there is often a ferrite core.

To increase the power transferred the system is operated at a high frequency of at least 1 kHz and preferably at least 10 kHz. An advantage of such a high frequency alternating current system is that devices can be installed or connected simply by placing a secondary winding, preferably with a ferrite core, within the magnetic field. However, the ferrite core needs to be suitably positioned around the power bus and also held in an accurate position with correct alignment.

GB2497428 discloses a two-part ferrite core comprising core parts (an E and I core) which are held together at all times by springs and mechanical mountings, using metal bars or cams, these cores can slide with respect to one another and are positively held together via a mechanical system including top roll bar and clamping springs. The cores are provided with springs that effectively pull the I core on top of the E core as the user pushes the cores into position. Due to variances in the spring properties, added to manufacturing tolerances in the springs, bars, cams, plastic mounting spring mountings and core dimensions, the required force per square inch across the inner surfaces of the cores suffers from wide variations in clamping force, which also becomes worse over time due to thermal and environmental exposure and spring degradation. As a result, the power transferred across the magnetic field reduces over time, to the point whereby the cores create audible noise and the products become un-useable.

The inventors have realised that the audible noise emissions are primarily caused by magnetostriction which is usually caused by an induction-dependent dimensional change of the magnetic cores. This is often caused by the cores not being clamped together strongly enough to maintain the required inductance. The inventors have found that the emitted sound is proportional to the square of the magnetic flux density.

If the cores are fixed together using springs they become less and less aligned over time due to loss in spring tension. Eventually the cores being misaligned create audible noise resulting in an output power drop. This could finally lead to thermal runaway whereby the products become unusable and eventually dangerous. As these devices have typically been installed behind ceilings the user is unaware until the audible noise becomes loud enough to hear, unfortunately that is too late to prevent large scale maintenance to replace melted cables and plastic enclosures. U.S. Pat. No. 6,140,899 (expired) also discloses a method of extracting DC from HFAC, the inventors found this method too may suffer from mechanical issues, similar to GB2497428.

It is therefore desirable to provide a method for speedily fixing a core to a power bus in which the correct position or alignment of the ferrite cores can be maintained. This will ensure that performance of the system does not degrade over time.

SUMMARY

According to the invention there is provided an inductively powered device driver comprising a secondary winding to be coupled to a primary winding and a ferrite core formed of two separable parts, and further comprising a permanent magnet attached to each part of the ferrite core.

The permanent magnet ensures that the two parts of the ferrite cores remain in close alignment. Advantageously, the strength of these does not degrade over time so the ferrite cores will remain in alignment even after a lengthy period.

A metal plate may be disposed between the two parts of the ferrite core. The metal plate may comprise a ferromagnetic material such as steel. The two parts of the ferrite core may have a closed position, for example in which the two parts are positioned against each other and held in place by the magnets. The metal plate may be sandwiched between the two parts of the core in this closed position. For example it may be arranged at a location between the parts of the ferrite core when the parts of the ferrite core are in the closed position.

The inductively powered device driver may comprise a guide for holding a wire of the power bus, the guide comprising a first guide part for holding a first portion of the wire of the power bus, and a second guide part for holding a second portion of the wire of the power bus.

The guide may be configured to position the first portion of the wire and the second portion of the wire for inductive coupling with the secondary winding. The guide may be provided by surface features, such as grooves, carried by the separable parts. For example the surface features may be carried by one of the separable parts. The grooves may be recessed into the ferrite material.

The guide may be configured to hold the two portions of the wire so that they are spaced apart and aligned with each other. For example the guide may hold the two parallel with each other.

One of the parts of the core may carry the secondary winding and the other of the parts of the core may carry two grooves for holding two corresponding portions of the power bus wire.

The permanent magnet is preferably separated from the ferrite core. In particular it is not in contact with the ferrite core and to facilitate this a piece of insulating material is arranged between the ferrite core and the permanent magnet. The insulating material may be plastic as it can easily be manipulated but could also be ceramic which has excellent thermal resistant properties; it could be constituted of another material with insulating properties. Separating the magnet from the ferrite core reduces and prevents the electromagnetic interference.

The permanent magnets preferably comprise a rare earth magnet but could be of another material which exhibits similar properties to a rare earth magnet. A rare earth magnet is a strong permanent magnet made from an alloy of a rare-earth element and examples of suitable rare earth magnets are Neodymium or Samarium-Cobalt. The permanent magnet may alternatively comprise Cerium or be a material which exhibits similar properties to a rare earth magnet.

The permanent magnets are arranged for holding the two parts of the core together. There are preferably at least two permanent magnets attached to each part of the ferrite core, with each permanent magnet having a corresponding permanent magnet on the opposite part of the ferrite core. The two permanent magnets should be positioned at different circumferential positions around the ferrite core. By having permanent magnets at at least two circumferential positions around the ferrite core the parts of the ferrite core can be rotationally aligned. An alternative to two permanent magnets arranged at different positions would be a single permanent magnet extending circumferentially around some, or all of, the core.

The one or more permanent magnets attached to each part of the ferrite core have a compressive strength (or pull pressure) of between 500 and 5,000 N/mm². The pull force of a magnet measures its maximum possible pull, or holding, force. It is measured as the force required to pull away a perfect mild steel plate which is sufficiently thick to be unsaturated by the magnetism. The pull pressure is the pull force averaged over the area of the magnet.

The force across the faces between the separable parts of the ferrite core caused by the permanent magnets is between 20 N/mm² and 1,000 N/mm². This is the force averaged across the area of the opposing faces of the parts of the ferrite core.

The permanent magnet is preferably arranged on the outer periphery of the ferrite core. Furthermore the permanent magnets attached to each part of the ferrite core have opposite polarity. Preferably each of the permanent magnets has a substantially equal magnetic strength.

The two parts of the ferrite core have a closed position and at least one part of the ferrite core preferably comprises a metal plate arranged at a location between the parts of the ferrite core when the parts of the ferrite core are in a closed position. The metal plate is preferably made of steel and this averages the magnetic force across the area as a whole. The combination of insulation between the permanent magnet and the ferrite core and the metal plate has been found to be particularly effective in ensuring a strong clamping force between the parts of the ferrite core. The magnets may be coated to prevent them from corrosion and this will also insulate them from the metal plate. They may be insulated with various materials including nickel-copper-nickel, gold, silver, zinc, tin, epoxy, PTFE and various paints and lacquers.

There may be a second pair of ferrite cores, each ferrite core of the second pair of cores comprising a permanent magnet attached to the ferrite core. The second pair of cores may be used for the inductive transfer of control signals from the power bus to the driver.

The device driver may comprise a microcontroller and may have an electrical device electrically connected to the inductively powered device driver. The electrical device or devices may comprise one or more of inter alia a light, an LED, a sensor, a charger, a timer, a camera, a motor, an audio device, a smoke alarm, a carbon monoxide detector, a gas detector, a gas discharger for fire suppression and a sprinkler. As an alternative the electrical device or devices may comprise a secondary electrical power bus.

The driver apparatus could be constructed in various ways, with the structures described in WO 2013/083949 providing one way to implement a driver apparatus for this inductive power controller.

DETAILED DESCRIPTION

Figure 1:
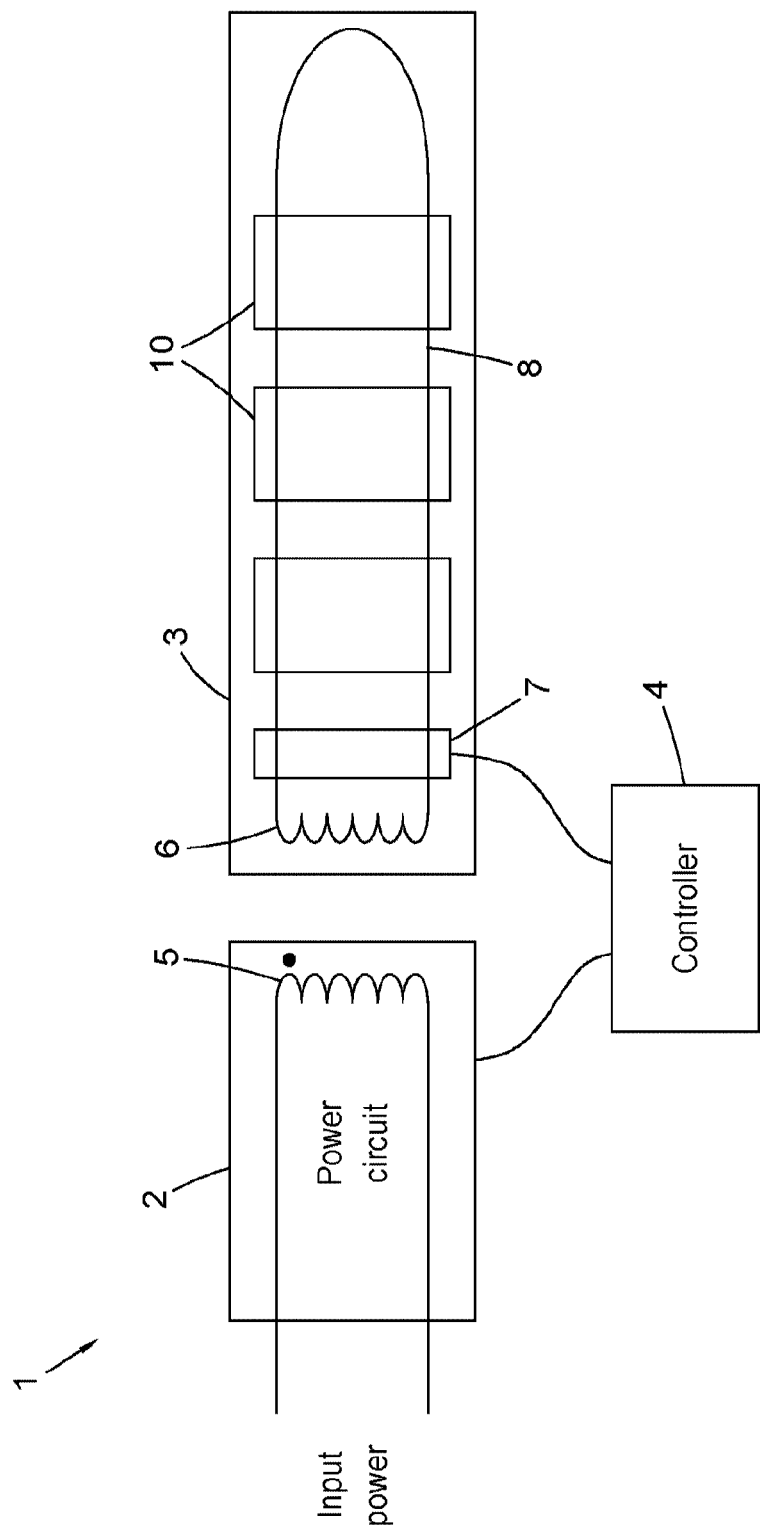
FIG. 1 depicts a power distribution system according to an embodiment of the invention.

FIG. 1 of the accompanying drawings depicts an HFAC power distribution system. The power distribution system comprises a power circuit 2, a controller 4 and a load circuit 3. The input power is from an AC source such as mains electricity, a generator or renewable sources such as solar, wind or wave. The input power is supplied to the power circuit which then modifies the electrical waveform. The power circuit and the load circuit are inductively coupled by a transformer with the primary inductor 5 on the power circuit and the secondary inductor 6 on the load circuit. The load circuit comprises a power bus 8 which is formed by a loop of insulated wire. The wire of the loop may be arranged as side by side wires and does not need to be twisted. Along the power bus are a plurality of device drivers 10 for peripheral devices. As shown in FIG. 1, the device drivers 10 are coupled to the loop at two locations on the wire—so that two separate portions of the wire are disposed in each device driver. In each device driver, the first of the two portions of the wire is closer to one terminal of the AC source than the second portion of the wire, and the second portion is closer to the other terminal. The device drivers may be configured to couple inductively with both portions of the wire for obtaining electrical energy to power the corresponding peripheral device. The peripheral devices may be, for example, inter alia lights, LEDs, sensors, battery chargers, timers, audio devices, cameras, irrigation devices, fire suppression devices, motors. Arranged on the load circuit is also a load detector 7 detects the load on the circuit and information is transmitted to the controller 4 which then controls variables of the power circuit.

Each of the device drivers comprises a ferrite core and a secondary winding. The high frequency alternating current from the power bus induces an alternating current in the secondary winding which powers the device. The device driver comprises two parts of a ferrite core which are arranged around the power bus.

As will be appreciated, loads such as lights can be installed without the need for specialised installers or qualified electricians. Indeed, it is an object of the invention to facilitate optimal installations by non-professionals such as householders.

Advantageously an HFAC power supply may be used in conjunction with extra-low voltage (SELV) requirements. This innovative mode of operation and the low voltages produced may facilitate compliance with extra low voltage standards such as SELV, further facilitating safe and user-friendly installations, without the need for specialised installers or qualified electricians.

With the use of SELV then even in jurisdictions with legal restrictions on domestic power supplies a householder will be able to manage a DIY electrical installation. When coupled with inductively connected loads this provides a system that is spark and arc free even in fault conditions.

The preferred embodiment is designed to be implemented for powering HFAC powered wireless power transmitters, facilitating the wireless charging of wearable and other low power devices, ear pods, earphones, watches, game controllers, fitness bands, health monitors etc up to 20 feet away from the power supply and installed loads. It is envisaged within the preferred invention, HFAC distribution also enables the use of HFAC powered Li-Fi enabled devices, particularly advantageous as the HFAC output cables can now extend greater than 400 m cable length with no standing wave issues.

Device Driver

The present invention relates to a driver for a device on the power bus. As described above, loads are inductively coupled and to improve the inductive coupling a core is often used.

Figure 2A:
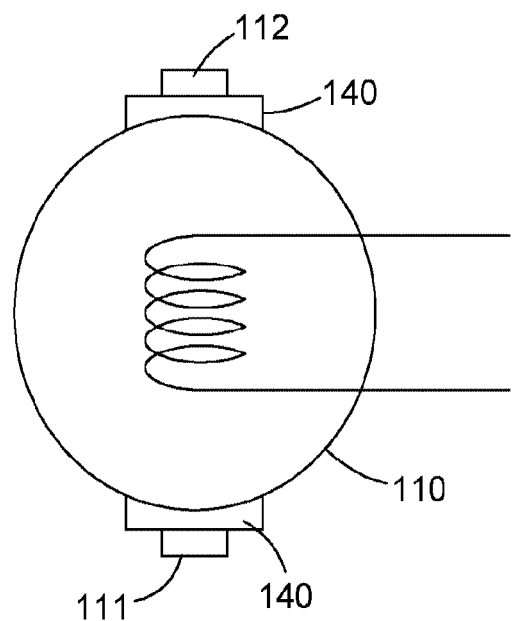
FIG. 2a depicts a first part of a ferrite core.
Figure 2B:
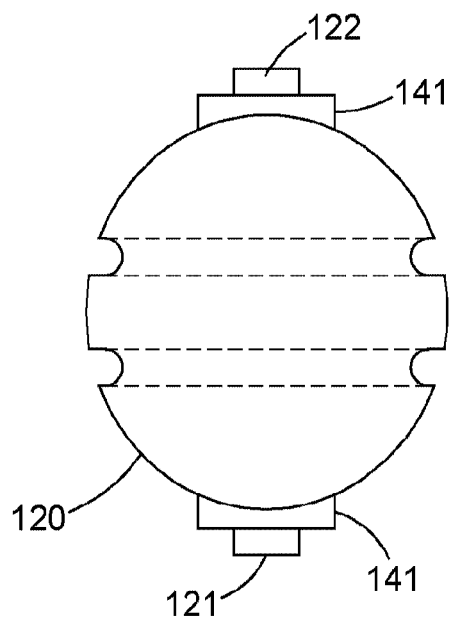
FIG. 2b depicts a second part of a ferrite core.

FIGS. 2a and 2b depict parts of the ferrite core. The core is ferrite and for optimal coupling the primary and secondary windings should be correctly aligned and firmly clamped together. In the present invention the ferrite core comprises two parts, a first part 110 and a second part 120. The secondary winding is attached to the first part of the ferrite core 110 and the second part of the ferrite core includes (e.g. carries) a guide, such as a recess or recesses into which the power bus can be positioned. This guide can be used for fixing the position of the wires of the power bus relative to the core, and to enable the core to be mechanically coupled to the power bus by fixing the two parts of the core together with the power bus wire in position in the guide. The guide may be arranged with respect to the core so as to hold both portions of the wire in a position for inductive coupling with the secondary winding via the core. For example as illustrated in FIG. 2B the guide comprises two parts. The first guide part allows a first portion of the power bus wire to be held in position, and a second guide part allows a second portion of the power bus wire to be held in position.

Each guide part may be configured to hold the corresponding portion of power bus wire aligned with the other portion of power bus wire, for example the two portions of wire may be held parallel with each other. The two guide parts may be spaced apart from each other to provide a corresponding spacing between the two portions of the power bus wire. The guide parts may be straight.

The guide parts illustrated in FIG. 2 comprise a surface feature, such as grooves disposed on the surface of a part of the core, but it will be appreciated in the context of the present disclosure that a guide for holding a wire can be implemented in other ways. In addition, the guide may be carried by the ferrite by being provided in and/or on its surface or by being disposed on the ferrite—for example it may be provided in a ferromagnetic metal plate disposed on the ferrite. Such a plate can be sandwiched between the two parts of the ferrite core when they are held together by the permanent magnets. An example of such a plate is described below with reference to FIG. 4.

According to an embodiment of the invention each part of the ferrite core has attached thereto two permanent magnets. The first part of the ferrite core has permanent magnets 111 and 112 attached at opposite sides and the second part of the ferrite core has permanent magnets 121 and 122 attached thereto.

The permanent magnets are formed out of a rare earth metal for example Neodymium or Samarium Cobalt. As an alternative to these, materials which exhibit similar characteristics may be used such as cobalt, CeCo3 and CeCo5. The advantage of Cerium is that it is abundant and easy to obtain.

The permanent magnets are plated in order to protect them from breaking or chipping, which would reduce the pull force between the parts of the ferrite core. As an alternative they may be coated.

Between each permanent magnet and the ferrite core is a portion of plastic or other insulating material 140, 141. This is important because of the existence of a high strength magnetic field around a ferrite magnetic core would be expected to cause problems with the electromagnetic power transfer across the cores, but experiments performed by the inventors have demonstrated that insulating the magnets from the cores eliminates any ill effects from a high strength magnetic field around a ferrite core.

Although the present example uses a portion of plastic any insulating material may be used such as a ceramic. Furthermore, the insulating material, or plastic need not be configured as depicted and could instead surround the entire ferrite core.

Figure 3:
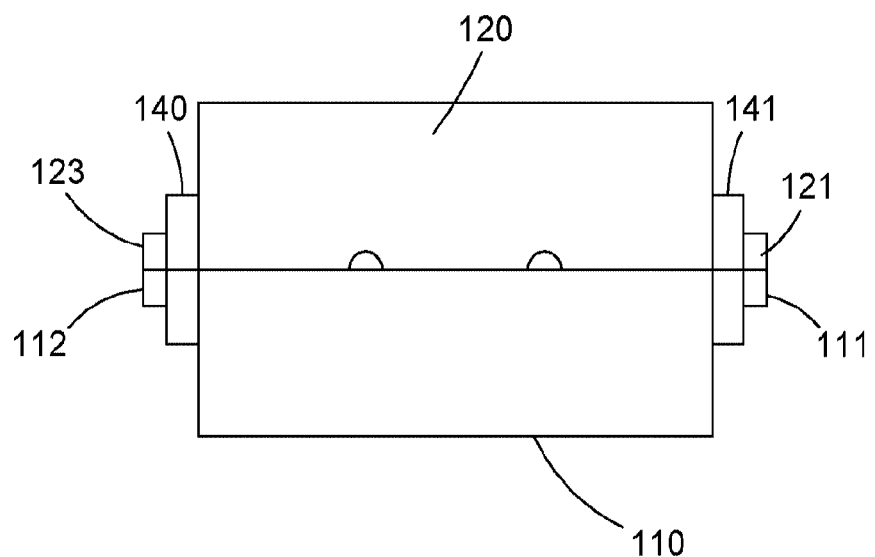
FIG. 3 depicts a ferrite core in a closed position.

FIG. 3 depicts the first and second portion of the ferrite core in a closed position. As can be seen magnet 111 from the first portion of the ferrite core is attracted to a magnet 121 from the second portion of the ferrite core and magnet 112 is attracted to magnet 122. By using two magnets the ferrite core can be correctly aligned, for example aligned rotationally. For example, the polarity of the magnets 111 and 121 on the first part 110 of the ferrite core may be opposite to each other, and the polarity of the magnets on the second part 120 of the ferrite core may also be opposite to each other (but in a complementary arrangement to those on the other part) so that the two parts of the core can only be fixed together in a predetermined alignment. In addition, the magnets may be positioned so as to ensure the opposing faces of the parts of the ferrite core fully cover each other with their edges mutually aligned. Thus the two portions of the ferrite core are well aligned.

Figure 4:
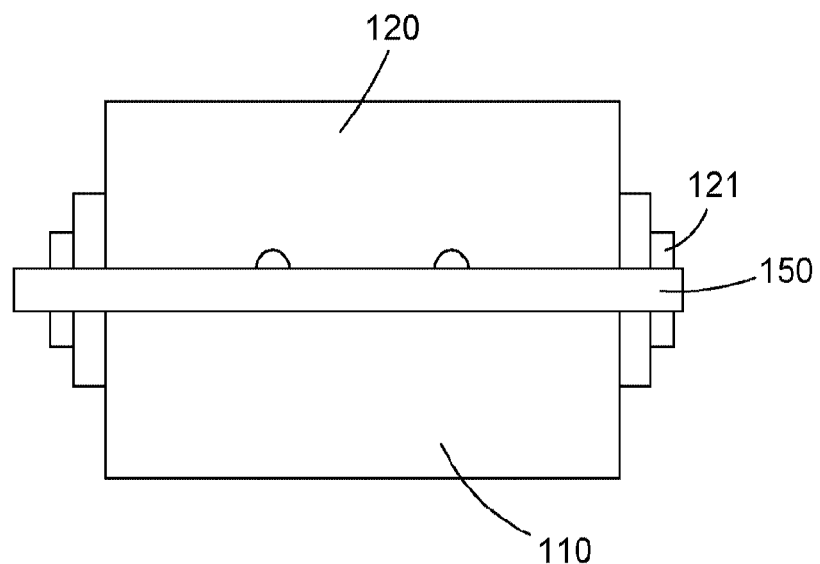
FIG. 4 depicts a ferrite core according to the invention.

FIG. 4 depicts an alternative ferrite core in which the first part of the ferrite core additionally comprises a metal plate 150 which extends between the faces of the ferrite core and the magnets. The metal plate helps to spread and enhance the magnetic field and therefore provides excellent core alignment. It also aids a high clamping force between the faces of the two parts of the ferrite core. Preferably the metal plate 150 is plated or anodised to prevent corrosion. As an alternative the metal plate may not form part of the first part of the ferrite core but could be a separate component.

Figure 5A:
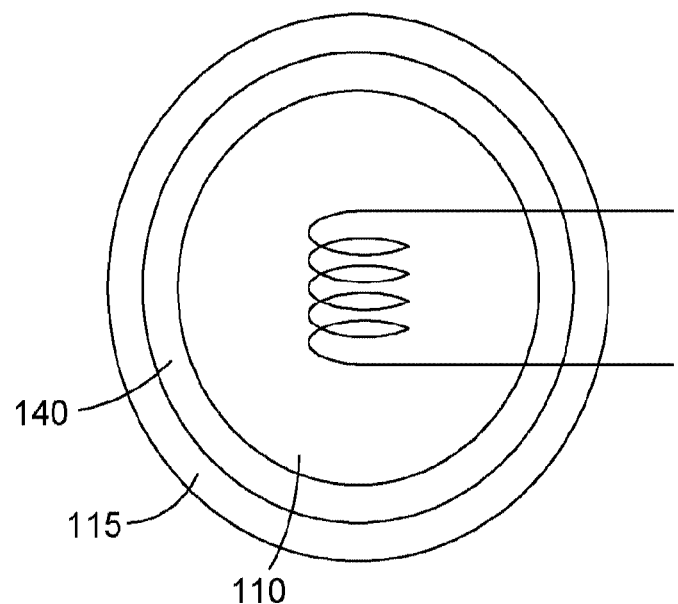
FIG. 5a depicts a first part of an alternative ferrite core.
Figure 5B:
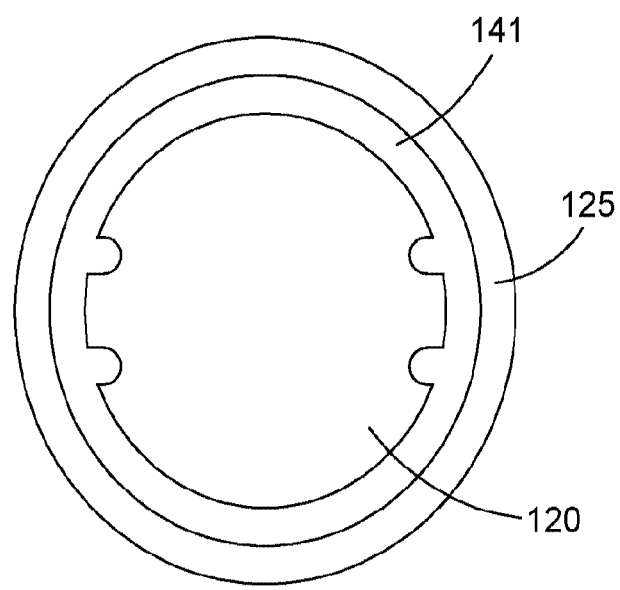
FIG. 5b depicts a second part of an alternative ferrite core.

The embodiment depicts each part of the ferrite core having two permanent magnets. However, there could be more, for example four permanent magnets or indeed one permanent magnet forming an annulus 115, 125 around the entire core as depicted in FIG. 5.

Figure 6:
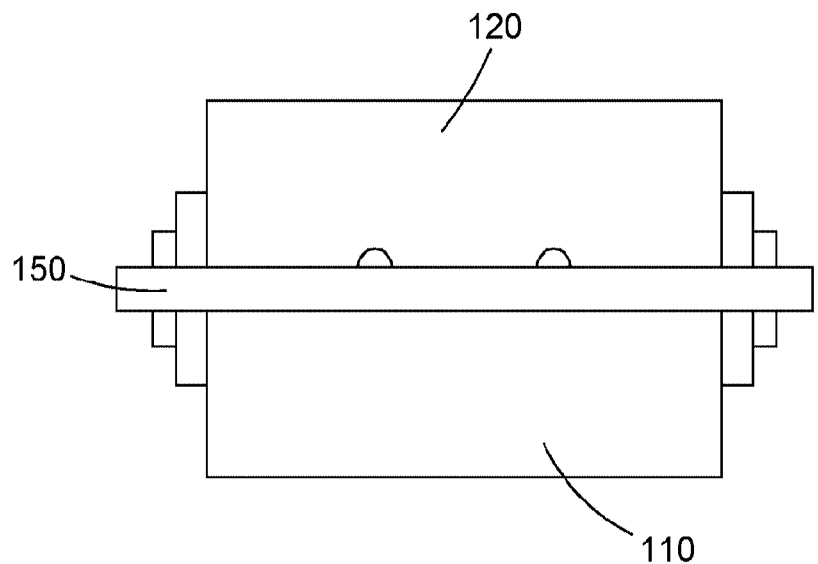
FIG. 6 depicts ferrite cores according to the invention.
Figure 6:
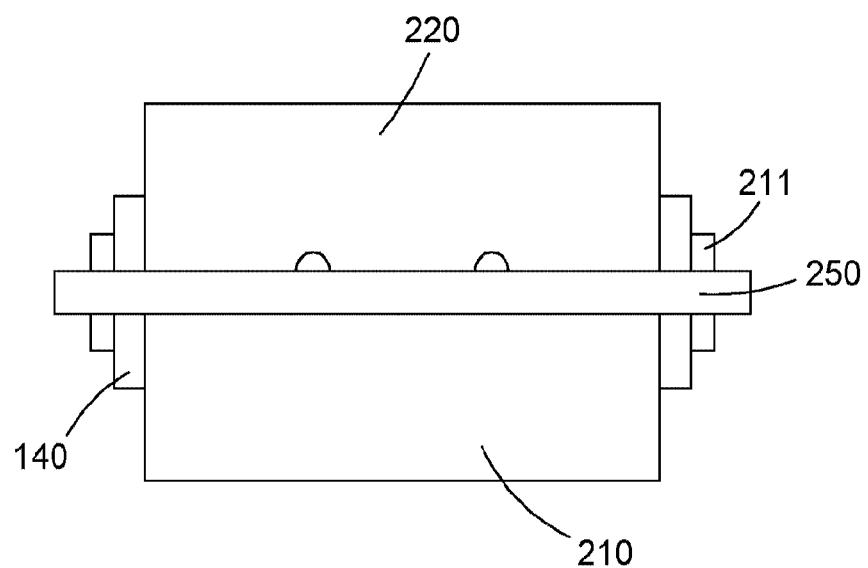

FIG. 6 depicts an embodiment in which there are two pairs of ferrite cores: a first pair of ferrite cores is, as described above, used for power transmission. A second pair of ferrite cores 210, 220 is used for communication. The ferrite may be a different grade such that the communication signals, also transmitted along the power bus, are communicated (transmitted). The second pair of ferrite cores also has a set of permanent magnets 211 which are arranged around the ferrite core. Just as in the first pair of ferrite cores, there is an insulating material positioned between the permanent magnet and the ferrite core to eliminate ill effects due to the permanent magnets. Similarly, the second pair of ferrite cores also comprises a metal plate 250.

Figure 7A:
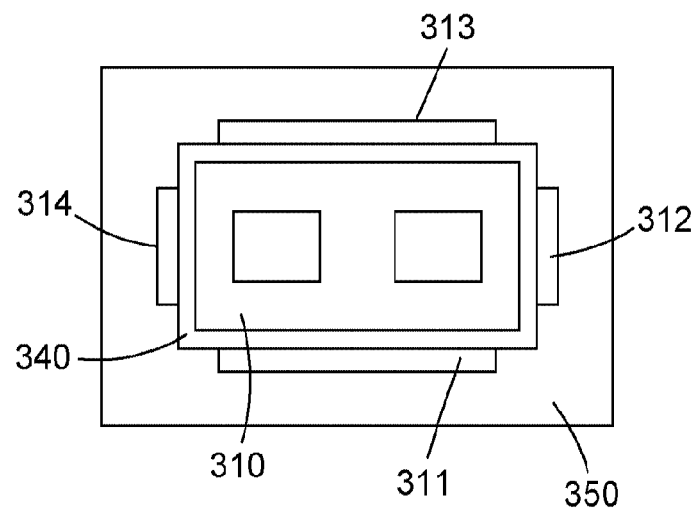
FIG. 7a depicts an E shaped part of a ferrite core according to the invention.
Figure 7B:
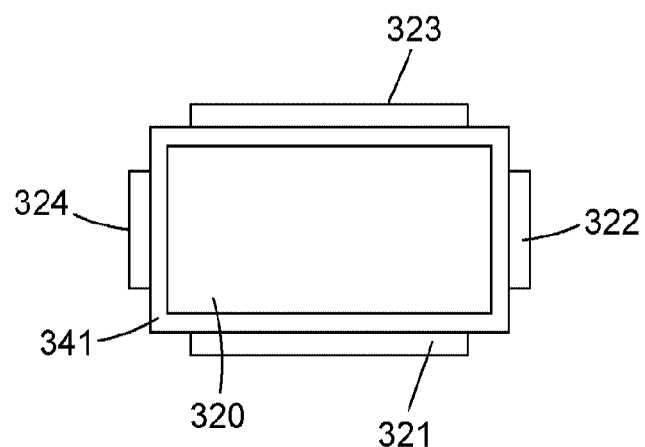
FIG. 7b depicts and I shaped part of a ferrite core according to the invention.

FIG. 7a depicts an E shaped part of a ferrite core 310 surrounded by a plastic shroud 340 around which are positioned four magnets 311, 312, 313, 314. Similarly to the ferrite cores described above there is a metal sheet 350 which is arranged between the parts of ferrite core in a closed position. FIG. 7b depicts a corresponding I shaped part of a ferrite core. The ferrite core is similarly surrounded by a plastic shroud 341 around which are positioned four magnets 321, 322, 323, 324. The magnets of the E and I shaped parts close the two parts of the ferrite core such that they are strongly held together in an accurate position and are correctly aligned—for example so the edges of the two cores are aligned with each other.

The magnetic locating and locking mechanism may be arranged to secure the two-part core around the cable wires with sufficient strength to keep the core in place during normal use. Thus, the strength of the magnets may be such that they will easily hold the weight of the core and/or the weight of a length of cable wire secured to the core. The magnetic core may use any suitably strong magnets. These magnets can provide sufficient strength to hold the accessory to the cable wires without any necessity for additional mechanical fixings, although in some examples a screw cap mechanism may augment the magnetic force. This screw cap mechanism may include a screw and/or a bayonet fitting. The body and/or the cap may include a clamping element allowing for resilient movement of the upper and lower bodies. One or both parts of the core may be held for rotation relative to the housing by the magnetic force such that they maintain alignment with one another during the cap fit operation.

Installation of device drivers according to the invention is considerably easier and faster than prior art examples with improved reliability and strong magnetic fields over the life of the product due to the mechanical design. Additionally, there is no requirement for industry qualified electricians as the use of junction boxes is eliminated. Furthermore the subsequent risk of fire caused by arcing connections is removed, whilst ensuring the electrocution risk is also negated. The HFAC system described herein may comprise a distributed bus HFAC system.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

It will further be appreciated by those skilled in the art that although the invention has been described by way of example with reference to several embodiments, it is not limited to the disclosed embodiments and that alternative embodiments could be constructed without departing from the scope of the invention as defined in the appended claims.

What is claimed is:

1. An inductively powered device driver for a high frequency alternating current (HFAC) system, the system comprising a power bus carrying HFAC for powering a plurality of inductively powered devices placed along the power bus, the device driver comprising:
    a secondary winding to be coupled to a primary winding formed by the power bus and
    a ferrite core formed of two separable parts, and further comprising a permanent magnet attached to each part of the ferrite core, wherein a metal plate is disposed between the two parts of the ferrite core, and wherein the metal plate comprises a ferromagnetic material.

2. The inductively powered device driver of claim 1, wherein the metal plate comprises steel.

3. The inductively powered device driver of claim 1 wherein the two parts of the ferrite core have a closed position and the metal plate is arranged at a location between the parts of the ferrite core when the parts of the ferrite core are in the closed position.

4. The inductively powered device driver of claim 1 comprising a guide for holding a wire of the power bus, the guide comprising a first guide part for holding a first portion of the wire of the power bus, and a second guide part for holding a second portion of the wire of the power bus.

5. The inductively powered device driver of claim 4 wherein the guide is configured to position the first portion of the wire and the second portion of the wire for inductive coupling with the secondary winding.

6. The inductively powered device driver of claim 4 wherein the guide is provided by surface features, such as grooves, carried by the separable parts.

7. The inductively powered device driver of claim 6 wherein the guide is configured to hold the two portions of the wire so that they are spaced apart and aligned with each other, for example parallel with each other.

8. An inductively powered device driver according to claim 1 wherein the permanent magnets are not in direct contact with the ferrite core.

9. An inductively powered device driver according to claim 8 further comprising a piece of insulating material arranged between each part of the ferrite core and each permanent magnet such that the permanent magnet is not in direct contact with the ferrite core.

10. An inductively powered device driver according to claim 1 wherein the permanent magnets comprise a rare earth magnet.

11. An inductively powered device driver according to claim 10 wherein the rare earth magnet is Neodymium or Samarium-Cobalt.

12. An inductively powered device driver according to claim 1 wherein there are two permanent magnets attached to each part of the ferrite core.

13. An inductively powered device driver according to claim 1 wherein the one more permanent magnets attached to each part of the ferrite core have a compressive strength of between 500 and 5,000 $N/mm^2$.

14. An inductively powered device driver according to claim 1 wherein the permanent magnet is arranged on the outer periphery of the ferrite core.

15. An inductively powered device driver according to claim 1 wherein the permanent magnets attached to each part of the ferrite core have opposite polarity.

16. An inductively powered device driver according to claim 1 wherein each of the permanent magnets has a substantially equal magnetic strength.

17. An inductively powered device driver according to claim 1 wherein the force across the faces between the separable parts of the ferrite core caused by the permanent magnets is between 20 $N/mm^2$ and 1,000 $N/mm^2$.

18. An inductively powered device driver according to claim 1 further comprising a second pair of ferrite cores, each ferrite core of the second pair of cores comprising a permanent magnet attached to the ferrite core.

19. An inductively powered device driver according to claim 1 further comprising a microcontroller.

20. A device comprising an inductively powered device driver according to claim 1 further comprising an electrical device electrically connected to the inductively powered device driver.

21. A device according to claim 20 wherein the electrical device comprises one or more of inter alia an LED, a light, a sensor, a charger, a timer, a camera, an audio device a smoke alarm, a carbon monoxide detector, a gas detectors, a motor, gas discharger for fire suppression and a sprinkler.

22. A device according to claim 20 wherein the electrical device comprises a secondary electrical power bus.

23. A device according to claim 1 wherein the permanent magnet comprises Cerium.

* * * * *